US012675093B2

(12) United States Patent
Mishima et al.

(10) Patent No.: US 12,675,093 B2
(45) Date of Patent: Jul. 7, 2026

(54) COMMUNICATION DEVICE, COMMUNICATION SYSTEM AND COMMUNICATION CONTROL METHOD

(71) Applicant: Panasonic Intellectual Property Management Co., Ltd., Osaka (JP)

(72) Inventors: Masashi Mishima, Osaka (JP); Daisuke Sonoda, Osaka (JP); Yoshiaki Ikeuchi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 610 days.

(21) Appl. No.: 18/004,328

(22) PCT Filed: Jun. 17, 2021

(86) PCT No.: PCT/JP2021/023014
§ 371 (c)(1),
(2) Date: Jan. 5, 2023

(87) PCT Pub. No.: WO2022/019014
PCT Pub. Date: Jan. 27, 2022

(65) Prior Publication Data
US 2023/0280718 A1     Sep. 7, 2023

(30) Foreign Application Priority Data
Jul. 22, 2020    (JP) ................................. 2020-125771

(51) Int. Cl.
*G05B 19/414*        (2006.01)

(52) U.S. Cl.
CPC .. *G05B 19/4141* (2013.01); *G05B 2219/2231* (2013.01)

(58) Field of Classification Search
CPC . H04L 12/12; H04L 12/4035; G05B 19/4141; G05B 19/0421; G05B 2219/2231; G06F 13/3625; G06F 13/4247
See application file for complete search history.

(56) References Cited

U.S. PATENT DOCUMENTS 6,317,415 B1    11/2001  Darnell et al.
9,961,634 B2 *   5/2018  Hosokawa ........ H04W 52/0216
(Continued)

FOREIGN PATENT DOCUMENTS

CN     106063197 A     10/2016
CN     114868366 A      8/2022
(Continued)

OTHER PUBLICATIONS

International Search Report of PCT application No. PCT/JP2021/023014 dated Sep. 21, 2021.
(Continued)

*Primary Examiner* — Rasheed Gidado
(74) *Attorney, Agent, or Firm* — Rimon P.C.

(57)        ABSTRACT

A communication device includes a processor and a communication part. The communication part communicates with one or more slaves. The processor has a function of executing communication processing and setting processing. The communication processing includes causing the communication part to transmit a frame including main data to the one or more slaves in a first period. The setting processing includes setting N (N is an integer of 2 or more) second periods within the first period. The setting processing includes setting a slot for performing communication of sub-data other than the main data for each of the second periods. The frame includes at least one of the slots during a transmission period of the main data.

19 Claims, 6 Drawing Sheets

(56)  References Cited

U.S. PATENT DOCUMENTS

| | | |
|---|---|---|
| 2003/0128702 A1 | 7/2003 | Satoh et al. |
| 2011/0141954 A1* | 6/2011 | Song ............. H04N 21/234327 |
| | | 370/310 |
| 2012/0069892 A1* | 3/2012 | Kim ................. H03M 13/2933 |
| | | 375/232 |
| 2015/0305028 A1* | 10/2015 | Shibuta ................ H04W 84/20 |
| | | 370/329 |
| 2017/0060794 A1 | 3/2017 | Zwart |
| 2017/0099158 A1 | 4/2017 | Mizutani et al. |
| 2019/0253356 A1 | 8/2019 | Yoneda et al. |
| 2020/0036786 A1 | 1/2020 | Yoneda et al. |
| 2022/0368559 A1* | 11/2022 | Mishima ............... H04L 47/826 |

FOREIGN PATENT DOCUMENTS

| | | | |
|---|---|---|---|
| EP | 3528448 | A1 | 8/2019 |
| EP | 4084417 | A1 | 11/2022 |
| JP | 2018-064245 | | 4/2018 |
| JP | 2019-139630 | A | 8/2019 |

OTHER PUBLICATIONS

The EPC Office Action dated Dec. 18, 2023 for the related European Patent Application No. 21846906.2.
English Translation of Chinese Search Report dated Dec. 10, 2025 for the related Chinese Patent Application No. 202180059989.1.

* cited by examiner

COMMUNICATION DEVICE, COMMUNICATION SYSTEM AND COMMUNICATION CONTROL METHOD

CROSS-REFERENCE TO RELATED APPLICATIONS

This application is a U.S. national stage application of the PCT International Application No. PCT/JP2021/023014 filed on Jun. 17, 2021, which claims the benefit of foreign priority of Japanese patent application No. 2020-125771 filed on Jul. 22, 2020, the contents all of which are incorporated herein by reference.

TECHNICAL FIELD

The present disclosure generally relates to a communication device, a communication system, a communication control method, and a program. More specifically, the present disclosure relates to the communication device, the communication system, the communication control method, and the program that communicate with one or more slaves.

BACKGROUND ART

PTL 1 discloses a communication device that is connected to a network and in which data is updated in every predetermined period. The communication device includes first scheduling part and a second scheduling part. The first scheduling part secures a first communication band necessary for updating first data used for controlling a manufacturing apparatus or a production facility in every predetermined period. The second scheduling part secures a second communication band necessary for causing second data to arrive at a transmission destination within a designated time. The second communication band is other than the first communication band among communication bands of the network.

In the communication device described in PTL 1, the second data (sub-data) can be transmitted in a free band other than a communication band necessary for communicating the first data (main data). However, this communication device has a problem that it is difficult to periodically transmit, receive, or transfer the second data (sub-data) at a period shorter than the time required for transmitting the first data (main data).

CITATION LIST

Patent Literature

PTL 1: Unexamined Japanese Patent Publication No. 2018-64245

SUMMARY OF THE INVENTION

The present disclosure has been made in view of the above points, and an object of the present disclosure is to provide a communication device, a communication system, a communication control method, and a program that make it easy to periodically transmit, receive, or transfer sub-data at a cycle shorter than the time required for transmitting main data.

A communication device according to one aspect of the present disclosure includes a processor and a communication part. The communication part communicates with one or more slaves. The processor has a function of executing communication processing and setting processing. The communication processing includes causing the communication part to transmit a frame including main data to the one or more slaves in a first period. The setting processing includes setting N (N is an integer of 2 or more) second periods within the first period. The setting processing includes setting a slot for performing communication of sub-data other than the main data for each of the N second periods. The frame includes at least one of the slots during a transmission period of the main data.

A communication system according to another aspect of the present disclosure includes the communication device and the one or more slaves. The one or more slaves are connected to the communication device and communicate with the communication device.

A communication control method according to another aspect of the present disclosure includes a communicating step and a setting step. The communicating step includes causing a frame including main data to be transmitted to one or more slaves connected to the communication device in a first period. The setting step includes setting N (N is an integer of 2 or more) second periods within the first period. The setting step includes setting a slot for performing communication of sub-data other than the main data for each of the second periods. The frame includes at least one of the slots during a transmission period of the main data.

A program according to another aspect of the present disclosure causes one or more processors to execute the communication control method described above.

The present disclosure has an advantage that it is easy to periodically transmit, receive, or transfer the sub-data at a cycle shorter than the time required for transmitting the main data.

BRIEF DESCRIPTION OF THE DRAWINGS

FIG. 1 is a block diagram illustrating an outline of a communication system having a communication device according to an exemplary embodiment of the present disclosure.

FIG. 2 is an explanatory diagram of communication processing by the communication device.

FIG. 5 is an explanatory diagram of division processing by the communication device.

DESCRIPTION OF EMBODIMENT

(1) Outline

Figure 1:
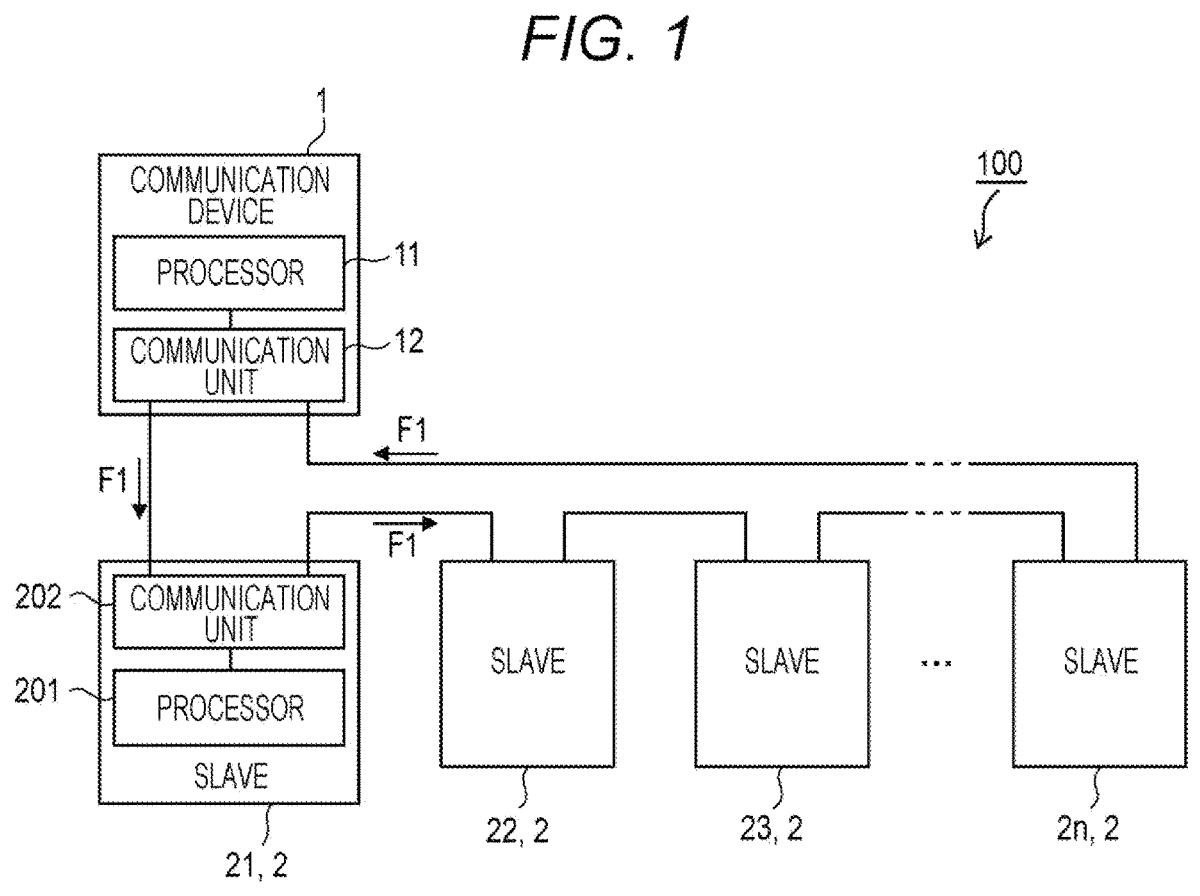
Figure 3:
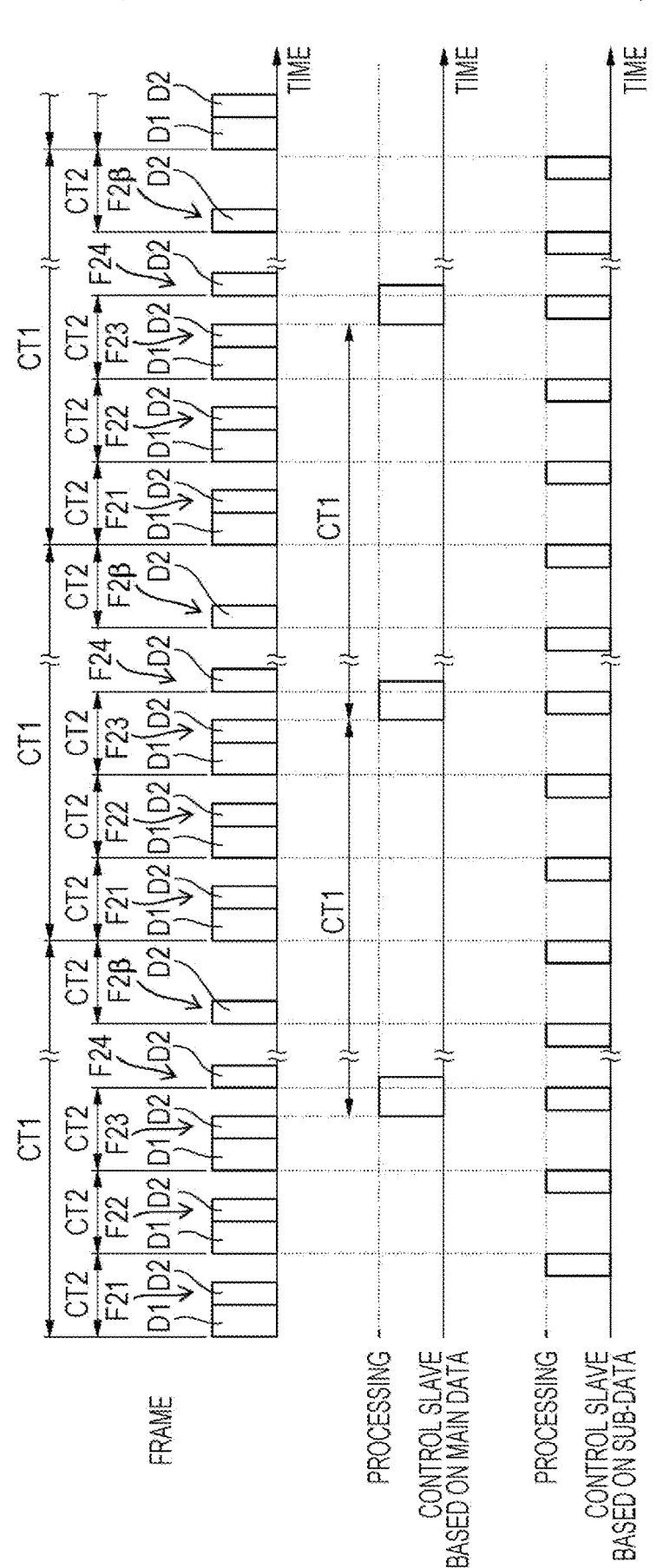
FIG. 3 is an explanatory diagram of operation timing of a slave included in the communication system.

FIG. 1 is a block diagram illustrating an outline of communication system 100 having communication device 1 according to an exemplary embodiment of the present disclosure. As illustrated in FIG. 1, communication system 100 includes communication device 1 and one or more (here, n (n is a natural number)) slaves 2 (21, 22, 23, . . . 2n) connected to communication device 1. Communication device 1 is a master corresponding to a host device of one or more slaves 2. Communication device 1 and one or more slaves 2 are connected to one network. One or more slaves 2 are connected to communication device 1 and communicate with communication device 1.

In the present exemplary embodiment, communication device 1 and one or more slaves 2 are connected to industrial network. The "industrial network" in the present disclosure is a field network used in factory automation, for example, and is used for communication between a plurality of devices installed in a factory. The industrial network may include, for example, Ethernet/internet protocol (Ethernet/IP) (registered trademark), Ether for Control Automation Technology (EtherCAT: registered trademark), or PROFI-NET (registered trademark). The device connected to the industrial network may include, for example, a controller (a programmable logic controller (PLC) or the like), a sensor (a displacement sensor, a flowmeter, a pressure gauge, an image sensor, or the like), or a remote input and output (I/O). The device connected to the industrial network may include, for example, a servo amplifier, an inverter, a robot, an actuator, or a valve.

The industrial network is required to have robustness, punctuality, and real time property as compared with standard best-effort networks used in offices and the like. For example, in an industrial network, in a case where control data is periodically transmitted from a controller to a device to be controlled such as a servo amplifier, a delay is not allowed as compared with a best effort type network, and an increase in response speed to the control data is required.

As illustrated in FIG. 1, communication device 1 includes processor 11 and communication part 12. Communication part 12 is a communication interface for communication with one or more slaves 2. Processor 11 has a function of executing communication processing and setting processing.

Figure 2:
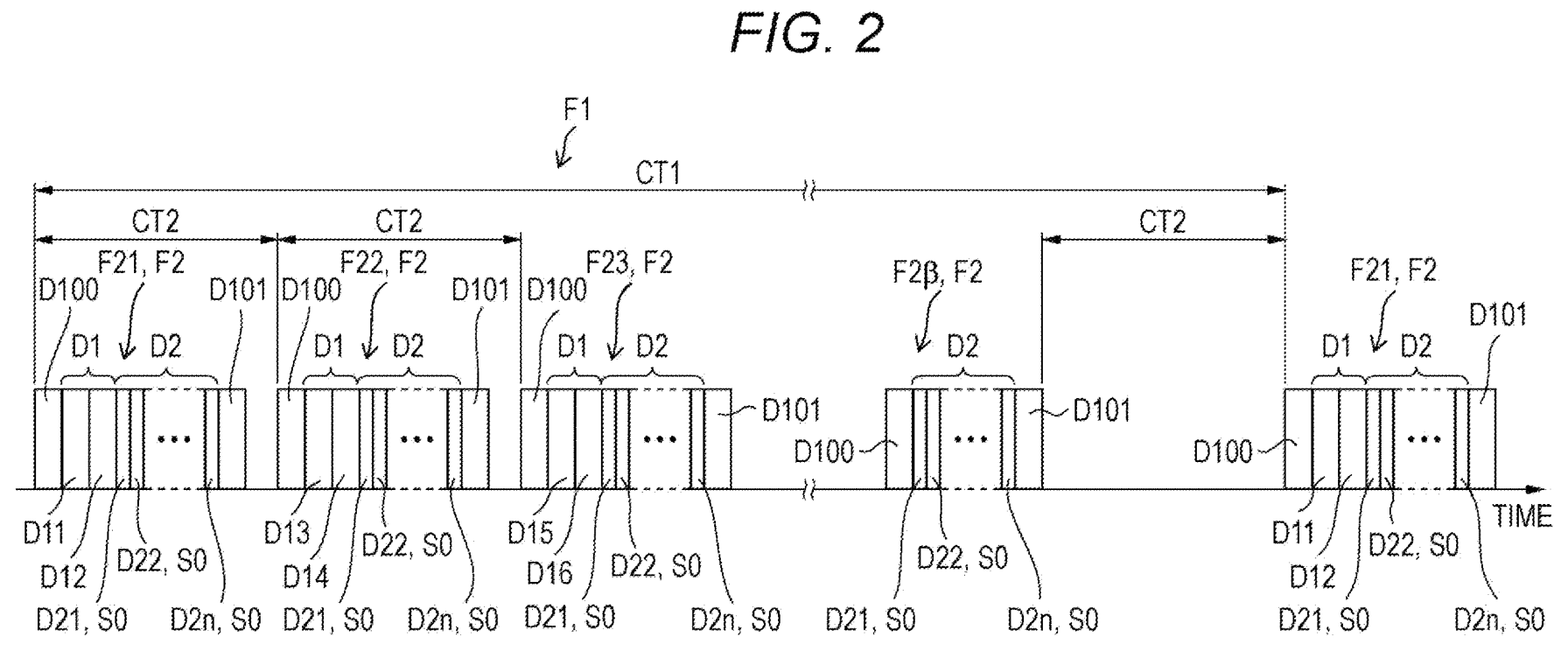

FIG. 2 is an explanatory diagram of communication processing by the communication device according to the exemplary embodiment of the present disclosure. The communication processing is a process of causing communication part 12 to transmit frame (communication frame) F1 including the main data to one or more slaves 2 in first period CT1. That is, communication device 1 executes the communication processing to transmit the main data to one or more slaves 2 in first period CT1. For example, when communication device 1 is a controller and one or more slaves 2 are devices such as servo amplifiers to be controlled, the main data may include control data for controlling slaves 2. First period CT1 is, for example, several tenth ms to several ms. When receiving the main data, each slave 2 executes processing in accordance with the received main data. For example, when the main data includes one or more pieces of control data corresponding to one or more slaves 2, each slave 2 acquires corresponding control data included in the main data upon receiving the main data, and executes processing in accordance with the acquired control data.

The setting processing includes setting second period CT2 within first period CT1. In the setting processing, processor 11 sets second period CT2 N times (N is an integer of 2 or more) within first period CT1. The setting processing includes setting slot S0 for performing communication of sub-data other than the main data for each second period CT2. That is, in first period CT1, each of the N second periods CT2 includes slot S0 for performing communication of the sub-data other than the main data.

In the present exemplary embodiment, in the setting processing, processor 11 allocates slot S0 to at least one slave 2 among one or more slaves 2 for each second period CT2.

Slave 2 can acquire data included in corresponding slot S0 (allocated slot S0) and transmit data to another device (communication device 1 or another slave 2) using corresponding slot S0. That is, slave 2 to which slot S0 is allocated can periodically receive the sub-data using slot S0 in every second period CT2 separately from the main data transmitted in first period CT1. Slave 2 to which slot S0 is allocated can periodically transmit the sub-data separately from the main data using slot S0 every second period CT2. That is, in the present exemplary embodiment, for example, there is an advantage that slave 2 connected to communication device 1 can easily transmit or receive the sub-data periodically (in second period CT2).

Further, in the communication processing, processor 11 causes frame F1 to be transmitted such that at least one slot S0 is included in the middle of the transmission period of the main data. In other words, at least one slot S0 of second period CT2 is inserted in the middle of frame F1. Therefore, in the present exemplary embodiment, for example, slave 2 to which slot S0 is allocated can periodically transmit, receive, or transfer the sub-data in a cycle (second period CT2) shorter than the transmission time of the main data (time required for transmitting the main data). That is, in the present exemplary embodiment, there is an advantage that it is easy to periodically transmit, receive, or transfer the sub-data in a cycle (second period CT2) shorter than the time required for transmitting the main data.

(2) Details

Hereinafter, communication system 100 including communication device 1 of the present exemplary embodiment will be described in detail with reference to FIG. 1. In the present exemplary embodiment, a plurality of (here, n (n is an integer of 1 or more)) slaves 2 are connected to communication device 1. The plurality of slaves 2 (in other words, one or more slaves 2) are daisy-chained to communication device 1. Specifically, first slave 21, second slave 22, third slave 23, . . . , and nth slave 2n are connected to communication device 1 in this order in a ring shape. Thus, in the present exemplary embodiment, frame F1 transmitted from communication device 1 is transferred to first slave 21, second slave 22, third slave 23, . . . , nth slave 2n, and communication device 1 in this order.

In communication system 100 according to the present exemplary embodiment, one of the plurality of slaves 2 is a sensor, and remaining slaves 2 are servo amplifiers. In other words, in the present exemplary embodiment, at least one of the one or more slaves 2 is a motor drive device that drives a motor. In communication system 100, communication device 1 is a controller that individually or entirely controls the plurality of slaves 2 (that is, the plurality of servo amplifiers and the sensor).

Communication device 1 includes processor 11 and communication part 12. In the present exemplary embodiment, communication device 1 stores data in a memory included in processor 11, but may include a storage separately from processor 11. Examples of the storage are an electrically rewritable nonvolatile memory such as an electrically erasable programmable read-only memory (EEPROM), and a volatile memory such as a random access memory (RAM).

Processor 11 includes, for example, a computer system. The computer system mainly includes a processor and a memory as hardware. By the processor executing a program recorded in the memory of the computer system, the function of processor 11 is achieved. The program may be recorded in advance in the memory of the computer system, may be provided through a telecommunication line, or may be provided by being recorded in a non-transitory storage readable by the computer system, such as a memory card, an optical disk, or a hard disk drive.

Communication part 12 is a communication interface for communicating with the plurality of slaves 2, and includes, for example, a wired communication module conforming to an industrial Ethernet (registered trademark) protocol. Communication part 12 transmits frames F1 to communication part 202 (described later) of slave 2 (in FIG. 1, first slave 21) at the foremost stage directly connected to communication device 1. Communication part 12 receives frames F1 transmitted from communication part 202 of slave 2 (in FIG. 1, nth slave 2n) at the rearmost stage directly connected to communication device 1.

Processor 11 has a function of executing communication processing, setting processing, and division processing. Both the setting processing and the division processing are processes executed before communication system 100 including communication device 1 is operated. The communication processing is a process executed while communication system 100 including communication device 1 is in operation.

The division processing is a process of dividing the main data into a plurality of main data pieces. In the present exemplary embodiment, the main data may include control data for each slave 2 transmitted from communication device 1 to each slave 2. Each main data piece after division may include some or all of the control data transmitted to at least one slave 2. In the division processing, processor 11 divides the main data into a plurality of main data pieces based on allowable maximum data size $ADm_{div}$ (described later). Details of the division processing will be described later in "(3) Setting Processing".

The communication processing is a process of causing communication part 12 to transmit frame F1 to the plurality of slaves 2 in first period CT1. First period CT1 is preset in communication device 1. In the present exemplary embodiment, communication device 1 transmits frame F1 to first slave 21, so that frame F1 is transmitted to first slave 21, second slave 22, third slave 23, . . . , and nth slave 2n in this order (see FIG. 1).

As illustrated in FIG. 2, frame F1 includes a plurality of divided frames F21, F22, . . . , and F2β (β is an integer of 2 or more). That is, in the communication processing, processor 11 (repeatedly) transmits frame F1 including the plurality of divided frames F21, F22, . . . , and F2β in first period CT1. Hereinafter, when the plurality of divided frames F21, F22, . . . , and F2β are not distinguished, they are referred to as "divided frame F2".

Here, "β" is the number of divisions. The number of divisions β is the number of divided frames F2 constituting frame F1, and is calculated in the setting processing as described later. The number of divisions β is equal to the number of times N of second period CT2 included in first period CT1.

More specifically, in the communication processing, a plurality of divided frames F21, F22, . . . , and F2β are transmitted from communication part 12 to the plurality of slaves 2 in second period CT2 within one first period CT1 (see FIG. 2). In other words, in the communication processing, processor 11 transmits the plurality of divided frames F21, F22, . . . , and F2β in second period CT2. Second period CT2 is set in the setting processing as described later.

As illustrated in FIG. 2, each divided frame F2 includes at least header D100, sub-data region D2, and footer D101. At least one of the plurality of divided frames F21, F22, . .

. , and F2β (in the example of FIG. 2, divided frames F21, F22, and F23) further includes main data region D1.

Main data region D1 is a region (slot) used for transmission of main data (main data piece). That is, the main data is transmitted in main data region D1. In each of at least one divided frame F2 (divided frames F21, F22, and F23) including main data region D1, main data region D1 includes at least a part of at least one slot of the plurality of slots D11, D12, . . . , and D1n (here, n is the number of slaves 2). The plurality of slots D11, D12, . . . , and D1n are allocated to the plurality of slaves 21, 22, . . . , and 2n, respectively. Main data region D1 of frame F1 preferably includes all of n slots D11, D12, . . . , D1n corresponding to n slaves 2.

In the example of FIG. 2, main data region D1 of divided frame F21 includes slots D11 and D12. Main data region D1 of divided frame F22 includes slots D13 and D14. Main data region D1 of divided frame F23 includes slots D15 and D16. That is, in each of divided frames F21, F21, and F23 including main data region D1, main data region D1 includes the entire two slots. However, the present invention is not limited to this example, and one slot (for example, slot D11 allocated to first slave 21) may be divided and included in main data region D1 of the plurality of divided frames F2. For example, main data region D1 of divided frame F21 may include a part of slot D11, and main data region D1 of divided frame F22 may include the remaining part of slot D11.

As described above, in the present exemplary embodiment, processor 11 divides the plurality of main data pieces in N second periods CT2 and transmits the divided main data pieces in the communication processing.

Slave 2 that has received frame F1 can acquire the main data from communication device 1 using the allocated slot (for example, in the case of first slave 21, slot D11) in main data region D1. Specifically, each slave 2 acquires the main data (control data of slave 2) for slave 2 from divided frame F2 including the slot allocated to slave 2. In the example of FIG. 2, first slave 21 can acquire the main data (the control data of first slave 21) from communication device 1 using slot D11 of divided frame F21. Third slave 23 can acquire the main data (control data of third slave 23) from communication device 1 using slot D13 of divided frame F22.

In the present exemplary embodiment, as described above, the main data may include the control data for each slave 2 transmitted from communication device 1 to each slave 2. The main data may include response data to the control data for each slave 2.

In the present exemplary embodiment, processor 11 includes data (hereinafter, also referred to as "synchronous data") indicating the end timing of transmission of the main data in frame F1 and transmits frame F1. That is, frame F1 may include synchronous data indicating the end timing of transmission of the main data. The synchronous data is included, for example, in header D100 of last divided frame F2 (in the example of FIG. 2, divided frame F23) including main data region D1 among the plurality of divided frames F2.

In each divided frame F2, sub-data region D2 is divided into a plurality (here, n) of slots D21, D22, . . . , and D2n. The plurality of slots D21, D22, . . . , and D2n correspond to slot S0 set in the setting processing, and are allocated to the plurality of slaves 21, 22, . . . , and 2n, respectively. That is, in the present exemplary embodiment, frame F1 includes slot S0. Each divided frame F2 includes slot S0. Slot S0 is set in the setting processing.

Slave 2 that has received divided frame F2 can acquire the sub-data included in allocated slot S0 (for example, in the case of first slave 21, slot D21) in sub-data region D2, and can transmit the sub-data to another device (communication device 1 or another slave 2) using slot S0. In the present exemplary embodiment, the sub-data may include various data transmitted from slave 2 to another slave 2. That is, slot S0 is used to perform communication of sub-data other than the main data. In particular, slot S0 can be used for communication between one or more slaves 2.

Here, in the present exemplary embodiment, processor 11 updates the main data in every first period CT1. Specifically, processor 11 generates the main data to be included in next frame F1 between the start of transmission of frame F1 and the start of transmission of next frame F1. When generating the main data, processor 11 refers to, for example, command information from a host system of communication device 1, response information received from each slave 2, and the like. For example, processor 11 generates control data (main data) for controlling each servo amplifier (each slave 2) by referring to detection information received from the sensor (slave 2). Therefore, first period CT1 needs to be set to such an extent that the processing for generating the main data can be executed, and depends on the processing performance of processor 11.

The setting processing is a process of setting second period CT2 and slot S0 used in the communication processing. That is, the communication processing is executed on the basis of the parameter set in the setting processing.

In the setting processing, processor 11 sets second period CT2 N times (N is an integer of 2 or more) within first period CT1. Second period CT2 is shorter than first period CT1. In the present exemplary embodiment, as will be described later, processor 11 sets second period CT2 on the basis of at least first period CT1, the data size of the main data, and the data size of the sub-data. Slot S0 is allocated to slaves 2 in every second period CT2. In the present exemplary embodiment, processor 11 allocates slot S0 to all slaves 2 in each second period CT2 (each divided frame F2). Slot S0 allocated to each slave 2 in the setting processing constitutes sub-data region D2 described above. Details of the setting processing will be described later in "(3) Setting Processing". The slot length of slot S0 allocated to each slave 2 may be different in accordance with a data size.

Slave 2 includes processor 201 and communication part 202. Slave 2 stores data in a memory included in processor 201, but may include a storage separately from processor 201. The storage is an electrically rewritable nonvolatile memory such as an EEPROM, a volatile memory such as a RAM, or the like.

Processor 201 includes, for example, a computer system. The computer system mainly includes a processor and a memory as hardware. By the processor executing a program recorded in the memory of the computer system, the function of processor 201 is achieved. The program may be recorded in advance in the memory of the computer system, may be provided through a telecommunication line, or may be provided by being recorded in a non-transitory storage readable by the computer system, such as a memory card, an optical disk, or a hard disk drive.

Processor 201 has a function of executing processing based on corresponding data (here, the control data) among the main data received by communication part 202. FIG. 3 is an explanatory diagram of the operation timing of the slave included in communication system 100 according to the explanatory exemplary embodiment of the present disclosure. As illustrated in FIG. 3, when receiving divided frame F2 (divided frame F23 in the example of FIG. 2) including the synchronous data, processor 201 executes processing according to the main data (control data) after the end of the reception of divided frame F2. Since divided frame F2 (divided frame F23) including the synchronous data is transmitted in first period CT1, processor 201 of each slave 2 executes processing according to the main data in first period CT1. In other words, frame F1 includes data (synchronous data) for controlling slave 2 in first period CT1. One or more (a plurality of) slaves 2 execute processing according to the main data in synchronization with each other based on the synchronous data. In other words, frame F1 includes data (synchronous data) for synchronizing the operations of one or more slaves 2.

Processor 201 has a function of executing processing according to corresponding data among the sub-data received by communication part 202. For example, with the reception time point of header D100 of each divided frame F2 as a reference, when a predetermined delay time has elapsed from this reception time point, processor 201 executes processing according to the sub-data received in this divided frame F2 (see FIG. 3). For example, the delay time is set to be shorter than second period CT2 by the time required for the processing according to the sub-data, but is not limited thereto. Since divided frame F2 is transmitted in second period CT2 as described above, processor 201 executes processing according to the sub-data in second period CT2.

Further, processor 201 has a function of executing a process of transmitting the sub-data to another device using allocated slot S0 in sub-data region D2 of received divided frame F2.

Communication part 202 is a communication interface for communicating with communication device 1 or another slave 2, and includes, for example, a wired communication module conforming to an industrial Ethernet (registered trademark) protocol. Communication part 202 receives frame F1 (divided frame F2) transmitted from communication part 12 of communication device 1 or communication part 202 of slave 2 in the previous stage directly connected to slave 2. Communication part 202 transmits received frames F1 (divided frame F2) to communication part 12 of communication device 1 at the subsequent stage directly connected to slave 2 or communication part 202 of slave 2. As an example, communication part 202 of first slave 21 receives frame F1 transmitted from communication part 12 of communication device 1, and transmits received frame F1 to communication part 202 of second slave 22. At this time, communication part 202 of first slave 21 may appropriately update received frame F1 and then transmit the frame.

(3) Setting Processing

Figure 4:
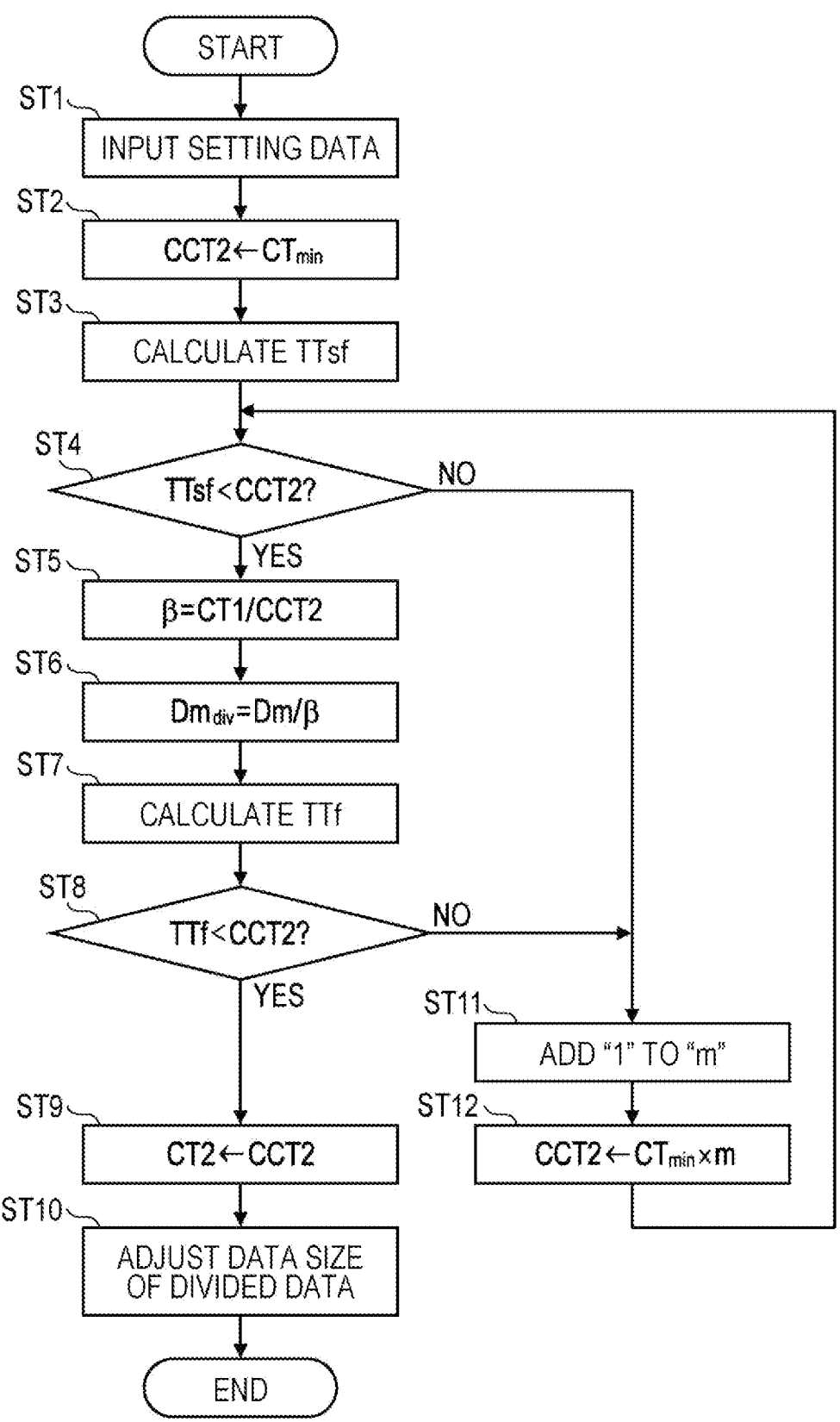
FIG. 4 is a flowchart of setting processing by the communication device.

Hereinafter, setting processing executed by processor 11 of communication device 1 will be described in detail with reference to FIG. 4. FIG. 4 is a flowchart illustrating the setting processing executed by communication device 1 according to the exemplary embodiment of the present disclosure.

As described above, the setting processing is a process of setting second period CT2 and slot S0. The setting processing is executed by processor 11 when the user performs a predetermined operation using a user interface included in communication device 1, for example, before communication system 100 is operated. Before the setting processing is executed, the user inputs setting data necessary for executing
the setting processing to communication device 1 using the
user interface.

In the present exemplary embodiment, the setting data
includes a total data size of the main data, a total data size
of the sub-data, and minimum communication period CT_{min}.
The total data size of the main data is a sum of the data sizes
of the main data receivable by respective slaves 2 for all the
frames. The total data size of the sub-data is a sum of all
frames of the data size of the sub-data that can be transmit-
ted, received, or transferred by each slave 2. Minimum
communication period CT_{min} is the minimum communica-
tion period allowed for communication between communi-
cation device 1 and one or more slaves 2. In the present
exemplary embodiment, minimum communication period
CT_{min} is the longest communication period among the com-
munication periods that can be handled by the plurality of
slaves 21, 22, . . . , and 2n.

The setting data may be acquired by communication
device 1 from each slave 2 when the communication
between communication device 1 and each slave 2 is estab-
lished and an initialization frame is transmitted from com-
munication device 1 to each slave 2. That is, communication
device 1 acquires the setting data from each slave 2 as a
response to the initialization frame. In this case, it is
assumed that the setting data is set in each slave 2 in
advance, for example, by the user inputting the setting data.

In the setting processing, when the setting data is input
(ST1), processor 11 first sets minimum communication
period CT_{min} as second period candidate CCT2 (ST2).
Processor 11 calculates minimum transmission time TTsf of
divided frame F2 (ST3). Minimum transmission time TTsf is
a transmission time (time required for transmission) of
divided frame F2 including only header D100, sub-data
region D2, and footer D101. Specifically, processor 11
calculates minimum transmission time TTsf by performing
calculation on the basis of the following Expression (1).

[Math. 1]

$$TTsf = (Dh + Ds + Df) \cdot \frac{1}{Tr} + x \cdot Td1 + Td2 \qquad (1)$$

In the above Expression (1), "Dh" represents the data size
of header D100 of divided frame F2, "Ds" represents the
total data size of the sub-data, and "Df" represents the data
size of footer D101 of divided frame F2. "Tr" represents a
transfer rate, "x" represents the number of devices (com-
munication device 1 and slave 2) belonging to communica-
tion system 100 (=n+1), "Td1" represents a delay time per
device, and "Td2" represents a delay time in entire commu-
nication system 100.

Processor 11 compares minimum transmission time TTsf
with second period candidate CCT2 (minimum communi-
cation period CT_{min}) (step ST4). When minimum transmis-
sion time TTsf is shorter than second period candidate CCT2
(Yes in step ST4), processor 11 calculates the number of
divisions β (step ST5). Specifically, processor 11 calculates
the number of divisions β by performing calculation on the
basis of the following Expression (2).

[Math. 2]

$$\beta = \frac{CT1}{CCT2} \qquad (2)$$

That is, the number of divisions β is a quotient calculated
by dividing first period CT1 by second period candidate
CCT2.

Next, processor 11 calculates data size Dm_{div} of the
divided data obtained by dividing the main data by perform-
ing calculation on the basis of the following Expression (3)
(step ST6).

[Math. 3]

$$Dm_{div} = \frac{Dm}{\beta} \qquad (3)$$

In the above Expression (3), "Dm" represents the total
data size of the main data.

Next, processor 11 calculates required transmission time
TTf of divided frame F2 (step ST7). required transmission
time TTf is a transmission time (time required for transmis-
sion) of divided frame F2 including header D100, the
transmission region of the divided data calculated in step
ST6, sub-data region D2, and footer D101. Specifically,
processor 11 calculates required transmission time TTf by
performing calculation on the basis of the following Expres-
sion (4).

[Math. 4]

$$TTf = (Dh + Dm_{div} + Ds + Df) \cdot \frac{1}{Tr} + x \cdot Td1 + Td2 \qquad (4)$$

Next, processor 11 compares required transmission time
TTf with second period candidate CCT2 (minimum com-
munication period CT_{min}) (step ST8). When required trans-
mission time TTf is shorter than second period candidate
CCT2 (Yes in step ST8), processor 11 sets second period
candidate CCT2 (minimum communication period CT_{min})
to second period CT2 (step ST9).

As described above, in the present exemplary embodi-
ment, in the setting processing, processor 11 sets second
period CT2 based on at least first period CT1, data size Dm
of the main data, and data size Ds of the sub-data.

When second period CT2 is set, processor 11 adjusts data
size Dm_{div} of the divided data based on second period CT2
and required transmission time TTf (step ST10). Here,
processor 11 calculates allowable maximum data size
ADm_{div} of the divided data. Allowable maximum data size
ADm_{div} is a maximum data size of divided data that can be
allocated to main data region D1 of one divided frame F2.
Specifically, processor 11 calculates allowable maximum
data size ADm_{div} by performing calculation on the basis of
the following Expression (5).

[Math. 5]

$$ADm_{div} = Dm_{div} + (CT2 - TTf - \alpha) \cdot Tr \qquad (5)$$

In the above Expression (5), "α" represents a margin time
in which jitter is taken into consideration.

After allowable maximum data size $\text{ADm}_{div}$ is calculated, processor 11 sets main data region D1 and sub-data region D2 of each divided frame F2.

Specifically, processor 11 sets slots D11, D12, . . . , and D1$n$ in main data region D1 of at least one divided frame F2 such that the entire main data is transmitted in any of the plurality of divided frames F21, F22, . . . , and F2β.

Figure 5:
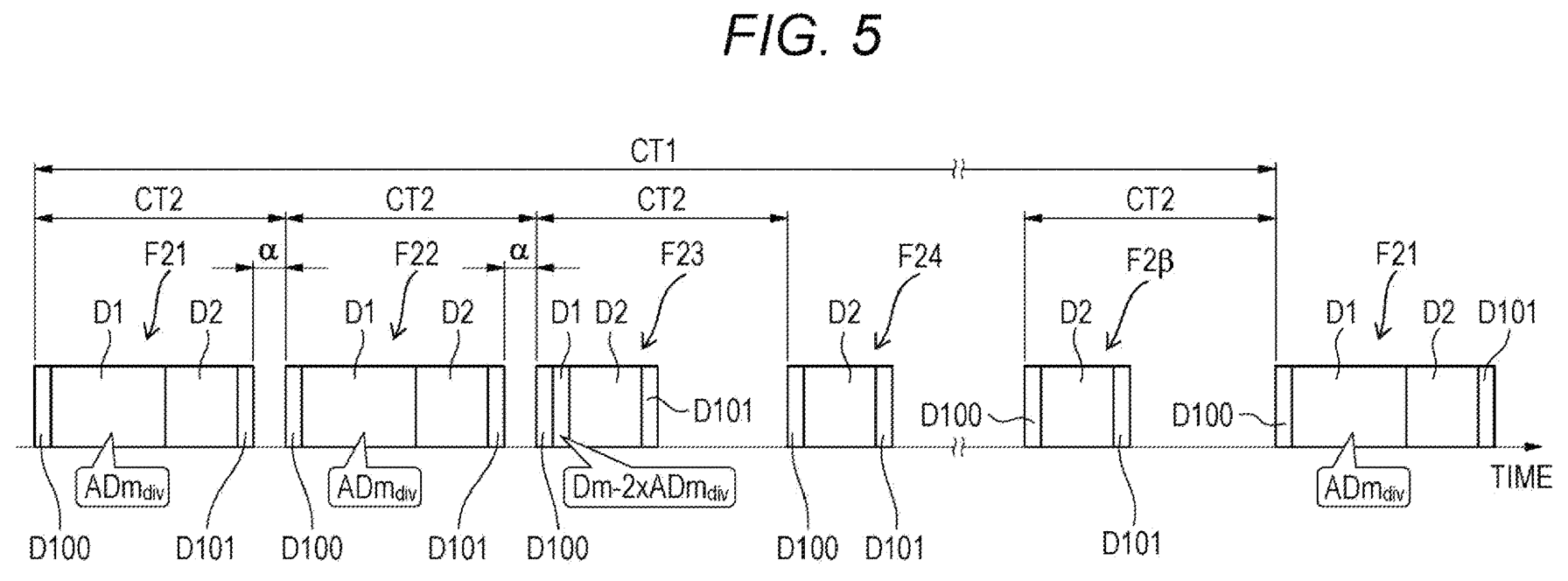

Processor 11 divides the main data into a plurality of pieces of divided data based on, for example, allowable maximum data size $\text{ADm}_{div}$, and thereby generates a plurality of main data pieces. FIG. 5 is an explanatory diagram of division processing by the communication device according to the exemplary embodiment of the present disclosure. For example, as illustrated in FIG. 5, processor 11 allocates the divided data (main data piece) having allowable maximum data size $\text{ADm}_{div}$ sequentially from first divided frame F21 among the plurality of divided frames F21, F22, . . . , and F2β. That is, in the present exemplary embodiment, the divided data (main data piece) is allocated to the plurality of divided frames F2 in a so-called "front filling". As a result, main data region D1 is set in at least one divided frame F2 of the plurality of divided frames F2.

In the example illustrated in FIG. 5, the total data size Dm of the main data is larger than twice and smaller than three times allowable maximum data size $\text{ADm}_{div}$. Therefore, the divided data (main data piece) having allowable maximum data size $\text{ADm}_{div}$ is allocated to first divided frame F21 and second divided frame F22. The divided data (main data piece) having a data size smaller than allowable maximum data size $\text{ADm}_{div}$ is allocated to third divided frame F23. Since the allocation of all the divided data is completed up to third divided frame F23, main data region D1 is not included in fourth and subsequent divided frames F24, . . . , F2β.

As described above, in the present exemplary embodiment, it can be said that step ST10 includes division processing of dividing the main data into a plurality of main data pieces.

Processor 11 sets sub-data region D2 for each set second period CT2 (that is, for each divided frame F2). Here, processor 11 allocates slot S0 to each slave 2 for each second period CT2 (for each divided frame F2). That is, processor 11 allocates slots D21, D22, . . . , and D2$n$ to slaves 21, 22, . . . , and 2$n$, respectively, as slot S0. In short, in the setting processing, processor 11 sets slot S0 for each second period CT2.

On the other hand, referring back to FIG. 4, in a case where minimum transmission time TTsf is equal to or longer than second period candidate CCT2 (No in step ST4) or in a case where required transmission time TTf is equal to or longer than second period candidate CCT2 (No in step ST8), processor 11 changes second period candidate CCT2 to a value larger than the current value. Here, processor 11 adds (increments) "1" to the number of repetitions "m" whose initial value is set to "1" (step ST11), and changes (updates) second period candidate CCT2 to a value obtained by the product of minimum communication period $\text{CT}_{min}$ and the current number of repetitions m (step ST12). Therefore, in the present exemplary embodiment, it can be said that processor 11 sets, as second period CT2, a period that is an integral multiple of the supportable communication period (minimum communication period $\text{CT}_{min}$) of one or more slaves 2 in the setting processing. Then, processor 11 returns to step ST4, and repeats steps ST11, ST12, and ST4 to ST8 until required transmission time TTf becomes smaller than second period candidate CCT2 (Yes in step ST8).

(4) Specific Examples

Hereinafter, a specific example of the setting processing will be described below. In the following description, it is assumed that first period CT1 is 500 μs. In the following description, it is assumed that communication system 100 includes three slaves 2 (first slave 21, second slave 22, and third slave 23). That is, in the following description, the number x of devices (communication device 1 and slaves 2) belonging to communication system 100 is four. In the following description, it is assumed that the data size of header D100 is 12 bytes and the data size of footer D101 is 12 bytes. In the following description, it is assumed that transfer rate Tr is 100 Mbps, delay time Td1 per slave 2 is 3 μs, delay time Td2 in entire communication system 100 is 1.5 μs, and time margin α is 3 μs.

First, a case where the setting data of each slave 2 is the data shown in Table 1 below will be described.

TABLE 1

|  | First slave | Second slave | Third slave |
|---|---|---|---|
| Data size of main data (Bytes) | 32 | 16 | 32 |
| Data size of sub-data (Bytes) | 4 | 4 | 8 |
| Corresponding communication period (μs) | 31.25 | 15.625 | 31.25 |

In this case, since total data size Ds of the sub-data is 16 ($=4+4+8$) bytes and the frame size of divided frame F2 including header D100, sub-data region D2, and footer D101 is 320 ($=(12+16+12)\times8$) bits, minimum transmission time TTsf is calculated as 16.7 ($=320/100+3\times4+1.5$) μs by Expression (1). In this case, since adaptable communication periods of first slave 21 and third slave 23 are the longest among adaptable communication periods of all slaves 21, 22, and 23, minimum communication period $\text{CT}_{min}$ is 31.25 μs. Since minimum transmission time TTsf is shorter than minimum communication period $\text{CT}_{min}$ (31.25 μs), processor 11 first sets minimum communication period $\text{CT}_{min}$ (31.25 μs) as second period candidate CCT2. In this case, the number of divisions β is 16 ($=500/31.25$) from Expression (2).

Since the total data size Dm of the main data is 80 ($=32+16+32$) bytes, data size $\text{Dm}_{div}$ of the divided data is 5 ($=80/16$) bytes according to Expression (3), and the frame size of divided frame F2 including header D100, the transmission region of the divided data, sub-data region D2, and footer D101 is 360 ($=(12+5+16+12)\times8$) bits. Therefore, required transmission time TTf is calculated as 17.1 ($=360/100+3\times4+1.5$) μs by Expression (4). Since required transmission time TTf is smaller than second period candidate CCT2 (minimum communication period $\text{CT}_{min}$ (31.25 vs)), processor 11 sets minimum communication period $\text{CT}_{min}$ (31.25 vs) as second period CT2.

Processor 11 divides the main data into the divided data on the basis of allowable maximum data size $\text{ADm}_{div}$. In this case, allowable maximum data size $\text{ADm}_{div}$ is 144.375 ($=5+(31.25-17.1-3)\times100/8$) bytes according to Expression (5), and allowable maximum data size $\text{ADm}_{div}$ is larger than data size Dm (80 bytes) of the main data. Therefore, for example, processor 11 generates divided frame F2 such that all the main data is transmitted in divided frame F21 (that is, only divided frame F21 includes main data region D1, and remaining divided frames F22, . . . , and F216 do not include main data region D1) without dividing the main data.

A case where the setting data of each slave 2 is the data shown in Table 2 below will be then described.

TABLE 2

|  | First slave | Second slave | Third slave |
|---|---|---|---|
| Data size of main data (Bytes) | 320 | 320 | 160 |
| Data size of sub-data (Bytes) | 40 | 20 | 160 |
| Corresponding communication period (μs) | 31.25 | 15.625 | 31.25 |

In this case, since total data size Ds of the sub-data is 220 (=40+20+160) bytes and the frame size of divided frame F2 including header D100, sub-data region D2, and footer D101 is 1952 (=(12+220+12)×8) bits, minimum transmission time TTsf is calculated as 33.02 (=1952/100+3×4+1.5) μs by Expression (1). In this case, since adaptable communication periods of first slave 21 and third slave 23 are the longest among adaptable communication periods of all slaves 21, 22, and 23, minimum communication period $CT_{min}$ is 31.25 μs. Since minimum transmission time TTsf is equal to or longer than minimum communication period $CT_{min}$ (31.25 μs), processor 11 adds "1" to the number of repetitions "m" whose initial value is "1", and sets a value (62.5 μs) obtained by multiplying minimum communication period $CT_{min}$ (31.25 μs) by the number of repetitions m (twice in this case) as second period candidate CCT2. In this case, the number of divisions β is 8 (=500/62.5) according to Expression (2).

Since the total data size Dm of the main data is 800 (=320+320+160) bytes, data size $Dm_{div}$ of the divided data is 100 (=800/8) bytes according to Expression (3), and the frame size of divided frame F2 including header D100, the transmission region of the divided data, sub-data region D2, and footer D101 is 2752 (=(12+100+220+12)×8) bits. Therefore, required transmission time TTf is calculated as 41.02 (=2752/100+3×4+1.5) μs by Expression (4). Since required transmission time TTf is smaller than second period candidate CCT2 (62.5 μs), processor 11 sets second period candidate CCT2 (62.5 μs) to second period CT2.

Processor 11 divides the main data into the divided data on the basis of allowable maximum data size $ADm_{div}$. In this case, allowable maximum data size $ADm_{div}$ is 331 (=100+(62.5−41.02−3)×100/8) bytes according to Expression (5). For example, processor 11 allocates divided data of 331 bytes of the main data having a total data size of 800 bytes to divided frames F21 and F22 among the plurality of (here, since the number of divisions β=8, the number of divisions β is eight) divided frames F21, F22, . . . , and F28, and allocates divided data of remaining 138 (=800−331×2) bytes to divided frame F23, thereby dividing the main data into main data pieces (divided data).

Figure 6:
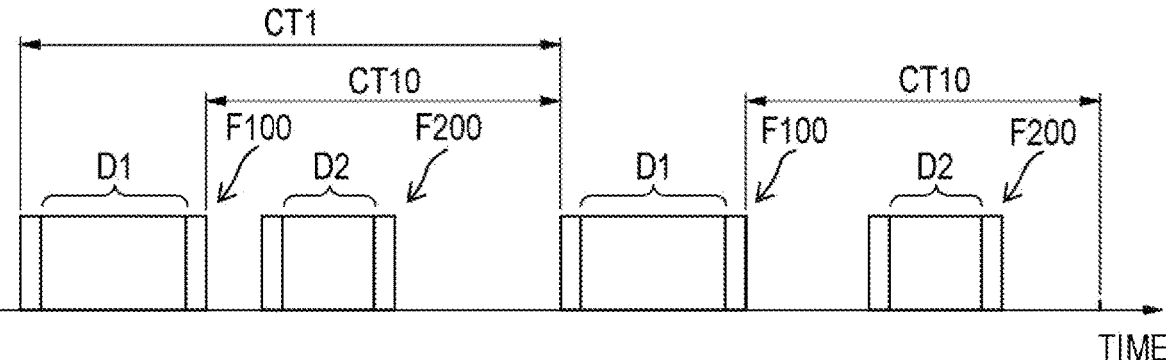
FIG. 6 is an explanatory diagram of communication processing by a communication device according to a comparative example.

Hereinafter, advantages of communication device 1 according to the present exemplary embodiment will be described with reference to comparison with a communication device of a comparative example. The communication device of the comparative example is different from communication device 1 of the present exemplary embodiment in that the communication device does not have a function of executing division processing and setting processing. FIG. 6 is an explanatory diagram of communication processing executed by a communication device of the comparative example. As illustrated in FIG. 6, the communication device of the comparative example causes all the main data to be transmitted from communication device 1 or slave 2 in one frame (main frame) F100 regardless of data size Dm of the main data. When sub-data different from the main data is transmitted from communication device 1 or slave 2, another frame (sub-frame) F200 including sub-data region D2 is transmitted in free region CT10 excluding main frame F100 in first period CT1. However, in the communication device of the comparative example, since second period CT2 is not set and the timing at which sub-frame F200 is transmitted is not defined, the sub-data cannot be periodically transmitted. Therefore, in the communication device of the comparative example, it is difficult to perform periodic communication that can withstand use in an industrial network for the sub-data different from the main data.

On the other hand, in communication device 1 according to the present exemplary embodiment, for example, slave 2 to which slot S0 is allocated in the setting processing can periodically receive the sub-data using slot S0 in every second period CT2 separately from the main data transmitted in first period CT1. For example, slave 2 to which slot S0 is allocated by the setting processing can periodically transmit the sub-data using slot S0 in every second period CT2 separately from the main data. That is, in the present exemplary embodiment, it is easy that sub-data is periodically transmitted, received, or transferred in slave 2 connected to communication device 1. Therefore, in the present exemplary embodiment, periodic communication that can withstand use in the industrial network is easily performed for not only the main data but also the sub-data.

In the communication device of the comparative example, in a case where the data size of the main data is relatively large, there is a possibility that only the transmission of the main data occupies half or more of first period CT1 (that is, it takes more than half of first period CT1 only by transmitting main frame F100). In this case, it is difficult to set second period CT2 a plurality of times within first period CT1. On the other hand, in the present exemplary embodiment, frame F1 includes at least one slot S0 in the middle of the transmission period of the main data. Therefore, in communication device 1 of the present exemplary embodiment, for example, slave 2 to which slot S0 is allocated can periodically transmit, receive, or transfer the sub-data in a cycle (second period CT2) shorter than the transmission time of the main data. Therefore, in the present exemplary embodiment, there is an advantage that it is easy for slave 2 connected to communication device 1 to periodically transmit, receive, or transfer the sub-data at a cycle shorter than the time required for transmitting the main data. Therefore, in the present exemplary embodiment, periodic communication that can withstand use in the industrial network is further easily performed for not only the main data but also the sub-data.

(5) Modification

The above-described exemplary embodiment is merely one of various exemplary embodiments of the present disclosure. The above exemplary embodiment can be variously changed according to a design and the like as long as the object of the present disclosure can be achieved. The same functions as those of communication device 1 may be embodied by a communication control method, a (computer) program, a non-transitory storage on which a program is recorded, or the like.

A communication control method according to one aspect includes a communication step and a setting step. The communication step is a step of transmitting frame F1 including main data to one or more slaves 2 connected to communication device 1 in first period CT1. The setting step is a step of setting N (N is an integer of 2 or more) second periods CT2 within first period CT1 and slot S0 for performing communication of sub-data other than the main data for each second period CT2. Frame F1 includes at least one slot S0 in the middle of the transmission period of the main data. A program according to one aspect causes one or more processors to execute the communication control method described above.

Modifications of the exemplary embodiment described above will be listed below. The modifications to be described below can be applied in appropriate combination.

Communication device 1 of the present disclosure includes, for example, a computer system in processor 11. The computer system mainly includes a processor and a memory as hardware. The processor executes a program recorded in the memory of the computer system to achieve a function of processor 11 in the present disclosure. The program may be recorded in advance in the memory of the computer system, may be provided through a telecommunication line, or may be provided by being recorded in a non-transitory storage readable by the computer system, such as a memory card, an optical disk, or a hard disk drive. The processor of the computer system includes one or a plurality of electronic circuits including a semiconductor integrated circuit (IC) or a large-scale integration (LSI) circuit. The integrated circuit such as the IC or the LSI in this disclosure is called differently depending on a degree of integration, and includes an integrated circuit called a system LSI, a very large scale integration (VLSI), or an ultra large scale integration (ULSI). Further, a field-programmable gate array (FPGA) programmed after manufacture of LSI, and a logical device capable of reconfiguring a joint relationship in LSI or reconfiguring circuit partitions in LSI can also be used as processors. The plurality of electronic circuits may be integrated into one chip or may be provided in a distributed manner on a plurality of chips. The plurality of chips may be aggregated in one device or may be provided in a distributed manner in a plurality of devices. The computer system in this disclosure includes a microcontroller having at least one processor and at least one memory. Therefore, the microcontroller is also constituted by one or a plurality of electronic circuits including a semiconductor integrated circuit or a large-scale integrated circuit.

Integration of a plurality of functions in processor 11 into one housing is not essential for processor 11. The components of processor 11 may be distributed in a plurality of housings. Further, at least some of the functions of processor 11 may be achieved by a server device, or a cloud (cloud computing), for example. On the contrary, as in the above-described exemplary embodiment, all the functions of processor 11 may be integrated into one housing.

In one modification, when slave 2 having a comparatively long adaptable communication period in the setting processing belongs to communication system 100, processor 11 of communication device 1 may make the adaptable communication period of slave 2 equal to adaptable communication periods of other slaves 2. That is, the adaptable communication period of slave 2 is a period necessary for executing processing having a comparatively large processing load, such as processing for generating and transmitting data. Therefore, in a case where processing having a comparatively small processing load such as processing for simply acquiring data is executed, the adaptable communication period of slave 2 can be set to be short. As described above, when the adaptable communication period of slave 2 is made to be equal to the other adaptable communication periods, minimum communication period $CT_{min}$ can be adjusted as a result. In other words, minimum communication period $CT_{min}$ may be set to any value.

In one modification, slot S0 may have a certain degree of variation based on a predetermined time. That is, the deviation of slot S0 is preferably within an allowable time shorter than at least second period CT2. Specifically, in second period CT2 in which divided frame F2 including main data region D1 is transmitted, the transmission of slot S0 may be started at any timing as long as the reception of slot S0 can be completed in slave 2 before the end of second period CT2. For example, even in a case where the end timing of main data region D1 is later than the example illustrated in FIG. 2, if the reception of slot S0 in each slave 2 is completed before the end of second period CT2, a deviation of the timing to start the transmission of slot S0 is allowed.

In one modification, the order of main data region D1 and sub-data region D2 in divided frame F2 is not limited to the case where main data region D1 comes first, and sub-data region D2 may come first.

In the setting processing of the above exemplary embodiment, when there are a plurality of types of slaves 2 having mutually different supportable communication periods, an integral multiple of a least common multiple of the supportable communication periods (repetition number m times) is set as second period CT2, but the present invention is not limited thereto. In one modification, not all the plurality of types of slaves 2 may be set as the allocation target of slot S0, but some of slaves 2 may be excluded from the allocation target of slot S0. For example, if slot S0 is to be allocated to only one type of slave 2 among the plurality of types of slaves 2, second period CT2 is set to an adaptable communication period of this type of slave 2.

In one modification, even when calculated second period CT2 does not coincide with an integral multiple of the adaptable communication period of each slave 2, calculated second period CT2 may be set as it is as second period CT2. In this case, first period CT1 may include a remainder period in addition to N second periods CT2.

In one modification, slave 2 is not limited to the motor drive device, and may be another device such as a sensor. In one modification, the motor drive device may not be included in the plurality of slaves 2. For example, all slaves 2 may be sensors.

In one modification, the number of slaves 2 belonging to communication system 100 may be one. In this aspect, communication device 1 can acquire the sub-data transmitted from slave 2 in second period CT2 while generating the main data in every first period CT1.

In the above exemplary embodiment, communication device 1 performs wired communication with each slave 2 using a wired communication module, but the present disclosure is not limited thereto. In one modification, communication device 1 may perform wireless communication with each slave 2 using a wireless communication module.

In one modification, processor 201 of slave 2 may cause communication part 202 to transmit other data other than the sub-data using, for example, a free region excluding divided frame F2 in second period CT2. As an example, the other data is data having a larger data size than control data included in the main data, and may include an image or the like used for monitoring or managing a manufacturing process or the like in a production line or a factory. Unlike the main data and the sub-data, the other data does not require punctuality and real-time property.

In the above-described exemplary embodiment, processor 11 of communication device 1 does not transmit the sub-data to each slave 2 in the communication processing, but may transmit the sub-data to each slave 2. That is, if there is a margin in the processing performance of processor 11, processor 11 can execute the processing for generating the sub-data in parallel with the processing for generating the main data and transmit the generated sub-data to each slave 2.

The method for updating second period candidate CCT2 is not limited to the method using the product of minimum communication period $CT_{min}$ and the number of repetitions m. In one modification, the input of second period candidate CCT2 may be received from the user, or a value twice as large as current second period candidate CCT2 may be used as updated second period candidate CCT2.

In one modification, processor 11 may divide the main data into a plurality of pieces of divided data (main data pieces) in parts of slave 2 in the division processing. In one example, processor 11 divides the main data into n pieces of divided data including divided data including the control data of first slave 21, divided data including the control data of second slave 22, . . . , and divided data including the control data of the nth slave 2. In another example, processor 11 divides the main data into n/2 (n is an even number) pieces of divided data including the divided data including the control data of first slave 21 and the control data of second slave 22, divided data including the control data of third slave 23 and the control data of the fourth slave 24, . . . , the divided data including the control data of the nth-1 slave 2n-1 and the control data of the nth slave 2n. That is, each of the plurality of pieces of divided data (main data pieces) can include the control data for at least one slave 2. In this case, after the data size of the divided data is adjusted (that is, division processing) (step ST10), there is a possibility that the transmission time of divided frame F2 including header D100, the transmission region of the divided data, sub-data region D2, and footer D101 exceeds second period CT2 set in step ST9. In that case, processor 11 may return to step ST11 to set (update) second period CT2 again. As a matter of course, as in the above-described exemplary embodiment, processor 11 may not use slave 2 as a part when dividing the main data into the plurality of main data pieces in the division processing.

In one modification, in a case where the main data is divided into a plurality of main data pieces in advance, processor 11 may not perform the division processing.

In one modification, processor 11 may not perform the process of re-adjusting the data size of the divided data (step ST10). For example, processor 11 may divide the main data into the divided data (main data pieces) on the basis of data size $Dm_{div}$ of the divided data calculated in step ST6.

In one modification, the data size of each of the plurality of main data pieces may be arbitrarily set within a range that can be transmitted in second period CT2. For example, in the division processing, processor 11 may divide the main data into the divided data having a data size smaller than allowable maximum data size $ADm_{div}$.

In one modification, the plurality of slaves 2 may not execute the processing according to the main data in synchronization with each other. For example, in the example of FIG. 2, first slave 21 and second slave 22 may execute the processing according to the main data without waiting for the transmission of divided frame F22 at the time point when the transmission of divided frame F21 is completed.

In one modification, in first period CT1 different from each other, second periods CT2 may be set to different values. That is, second period CT2 may be variable for each first period CT1. However, second periods CT2 different from each other are preferably obtained before communication system 100 is operated.

In an example of the daisy chain connection, first slave 21, second slave 22, third slave 23, . . . , and nth slave 2n may be sequentially connected to communication device 1 in a line shape. In this case, frame F1 transmitted from communication device 1 is transmitted to first slave 21, second slave 22, third slave 23, . . . , and nth slave 2n in this order.

(6) Aspects

The following aspects are disclosed based on the above-described exemplary embodiment, variations, and the like.

Communication device (1) according to a first aspect includes processor (11) and communication part (12). Communication part (12) communicates with one or more slaves (2). Processor (11) has the function of executing the communication processing and the setting processing. The communication processing is processing for causing communication part (12) to transmit frame (F1) including the main data to one or more slaves (2) in first period (CT1). The setting processing includes setting second period (CT2) of N times (N is an integer of 2 or more) within first period (CT1). The setting processing includes setting slot (S0) in which communication of the sub-data other than the main data is performed for each second period (CT2). Frame (F1) includes at least one slot (S0) in the middle of the transmission period of the main data.

According to this aspect, at least one of the periodic transmission and reception of the sub-data can be performed in a period (second period (CT2)) shorter than the transmission time of the main data. Therefore, in this aspect, there is an advantage that it is easy to periodically transmit or receive the sub-data at a cycle shorter than the time required for transmitting the main data.

In communication device (1) of a second aspect, in the first aspect, the setting processing includes allocating a slot (S0) to at least one slave (2) among one or more slaves (2) every second period (CT2).

According to this aspect, slave (2) to which slot (S0) is allocated can periodically transmit, receive, or transfer the sub-data using slot (S0).

In communication device (1) of a third aspect, in the first or second aspect, frame (F1) includes data for controlling one or more slaves (2) in a first period (CT1).

According to this aspect, slave (2) can be controlled every first period (CT1).

In communication device (1) of a fourth aspect, in any one of the first to third aspects, frame (F1) includes data for synchronizing operations of one or more slaves (2).

According to this aspect, the operations of one or more slaves (2) can be synchronized.

In communication device (1) of a fifth aspect, in any one of the first to fourth aspects, one or more slaves (2) are daisy-chained to communication device (1).

According to this aspect, since communication device (1) only needs to transmit frame (F1) to slave (2) directly connected to communication device (1) among one or more slaves (2), the processing load of communication device (1) is easily reduced.

In communication device (1) of a sixth aspect, in any one of the first to fifth aspects, the main data includes a plurality of main data pieces. In the communication processing, processor (11) divides the plurality of main data pieces into N second periods (CT2) and transmits the divided pieces.

According to this aspect, it is easy to periodically transmit, receive, or transfer the sub-data in a period shorter than the time required for transmitting the main data.

In communication device (1) of a seventh aspect, in the sixth aspect, processor (11) further has a function of executing division processing of dividing the main data into a plurality of main data pieces.

According to this aspect, the main data can be divided into the plurality of main data pieces, the plurality of main data pieces can be divided and transmitted in N second periods (CT2), and the processing of inserting slot (S0) of second period (CT2) in the middle of the transmission period of frame (F1) becomes easy.

In communication device (1) of an eighth aspect, in the seventh aspect, the data size of each of the plurality of main data pieces is arbitrarily set within a transmittable range in second period (CT2).

According to this aspect, the division aspect of the main data piece can be arbitrarily set.

In communication device (1) of a ninth aspect, in any one of the sixth to eighth aspects, processor (11) sets second period (CT2) based on at least first period (CT1), data size (Dm) of the main data, and data size (Ds) of the sub-data in the setting processing.

According to this aspect, it is easy to set the number of times of second period (CT2) included in the first period (CT1) to be large, and as a result, it is possible to increase the number of times of transmitting, receiving, or transferring the sub-data in the first period (CT1).

In communication device (1) according to a tenth aspect, in any one of the first to ninth aspects, processor (11) sets, as second period (CT2), a period that is an integral multiple of a communicable period of one or more slaves (2) in the setting processing.

According to this aspect, synchronization between communication device (1) and one or more slaves (2) can be easily achieved.

In communication device (1) according to an eleventh aspect, in any one of the first to tenth aspects, at least one slave (2) out of the one or more slaves (2) is a motor drive device that drives a motor.

According to this aspect, it is easy to periodically control the motor drive device using not only the main data but also the sub-data.

Communication system (100) according to a twelfth aspect includes communication device (1) according to any one of the first to eleventh aspects, and one or more slaves (2). One or more slaves (2) are connected to communication device (1) and communicate with communication device (1).

According to this aspect, the sub-data different from the main data can be periodically transmitted, received, or transferred using slot (S0). Therefore, according to this aspect, there is an advantage that it is easy to periodically transmit, receive, or transfer the sub-data at a cycle shorter than the time required for transmitting the main data.

A communication control method according to a thirteenth aspect includes a communication step and a setting step. The communication step is a step of causing frame (F1) including the main data to be transmitted to one or more slaves (2) connected to communication device (1) in first period (CT1). The setting step includes setting N (N is an integer of 2 or more) second periods (CT2) within first period (CT1). The setting step includes setting slot (S0) for performing communication of sub-data other than the main data every N second periods (CT2). Frame (F1) includes at least one slot (S0) in the middle of the transmission period of the main data.

According to this aspect, it is possible to periodically transmit, receive, or transfer the sub-data in a cycle (second period (CT2)) shorter than the transmission time of the main data. Therefore, in this aspect, there is an advantage that it is easy to periodically transmit, receive, or transfer the sub-data at a cycle shorter than the time required for transmitting the main data.

A program according to a fourteenth aspect causes one or more processors to execute the communication control method according to the thirteenth aspect.

According to this aspect, it is possible to periodically transmit, receive, or transfer the sub-data in a cycle (second period (CT2)) shorter than the transmission time of the main data. Therefore, in this aspect, there is an advantage that it is easy to periodically transmit, receive, or transfer the sub-data at a cycle shorter than the time required for transmitting the main data.

INDUSTRIAL APPLICABILITY

The present disclosure is suitable for a communication device, a communication system, a communication control method, and a program that need to transmit or receive sub-data within a predetermined time while performing periodic transmission of main data.

REFERENCE MARKS IN THE DRAWINGS

1: communication device
11: processor
12: communication part
2: slave
100: communication system
CT1: first period
CT2: second period
F1: frame
S0: slot

The invention claimed is:

1. A communication device comprising:
a processor; and
a communication part that is configured to communicate with one or more slaves, wherein the processor has a function of executing
communication processing of causing the communication part to transmit a data frame including main data to the one or more slaves in a first period, and
setting processing of setting N second periods, where N is an integer of 2 or more, within the first period and a slot for performing communication of sub-data other than the main data for each of the N second periods,
the data frame includes the slot during a transmission period of the main data,
the main data includes a plurality of main data pieces,
the processor is configured to divide the plurality of main data pieces in the N second periods, the divided main data pieces being transmitted in the communication processing, and
the processor is configured to set the second period based on at least one of the first period, a data size of the main data, and a data size of the sub-data in the setting processing.

2. The communication device according to claim 1, wherein the setting processing includes allocating the slot to at least one slave of the one or more slaves for each of the N second periods.

3. The communication device according to claim 1, wherein the data frame includes data for controlling the one or more slaves in the first period.

4. The communication device according to claim 1, wherein the data frame includes data for synchronizing operations of the one or more slaves.

5. The communication device according to claim 1, wherein the one or more slaves are daisy-chained to the communication device.

6. The communication device according to claim 1, wherein the processor further has a function of executing division processing of dividing the main data into the plurality of main data pieces.

7. The communication device according to claim 6, wherein the plurality of main data pieces each have a data size that is allowed based on a length of the second period.

8. The communication device according to claim 1, wherein the processor is configured to set, as the second period, a period that is an integral multiple of a communication period that is capable of being handled by the one or more slaves in the setting processing.

9. The communication device according to claim 1, wherein at least one slave of the one or more slaves is a motor drive device that drives a motor.

10. A communication system, comprising:

the communication device according to claim 1; and the one or more slaves that are connected to the communication device and communicate with the communication device.

11. The communication device according to claim 1, wherein the data frame includes the slot for at least one time during the transmission period of the main data.

12. The communication device according to claim 1, wherein the processor is configured to set the second period based on the first period.

13. The communication device according to claim 1, wherein the processor is configured to set the second period based on the data size of the main data.

14. The communication device according to claim 1, wherein the processor is configured to set the second period based on the data size of the sub-data.

15. A communication control method comprising:

causing a data frame including main data to be transmitted to one or more slaves connected to a communication device in a first period; and setting N second periods, where N is an integer of 2 or more, within the first period and a slot for performing communication of sub-data other than the main data for each of the N second periods, wherein the data frame includes the slot during a transmission period of the main data, the main data includes a plurality of main data pieces, and the method comprises dividing the plurality of main data pieces in the N second periods, the divided main data pieces being transmitted in the communication processing, and setting the second period based on at least one of the first period, a data size of the main data, and a data size of the sub-data in the setting.

16. The communication control method according to claim 15, wherein the data frame includes the slot for at least one time during the transmission period of the main data.

17. The communication method according to claim 15, wherein the setting the second period is performed based on the first period.

18. The communication method according to claim 15, wherein the setting the second period is performed based on the data size of the main data.

19. The communication method according to claim 15, wherein the setting the second period is performed based on the data size of the sub-data.

* * * * *